United States Patent [19]
Kuroda

[11] Patent Number: 6,072,484
[45] Date of Patent: Jun. 6, 2000

[54] GRAPHIC USER INTERFACE FOR TAB SETTING WITH A RE-SIZEABLE SCALE

[75] Inventor: Akihiko Kuroda, Cary, N.C.

[73] Assignee: International Business Machines Corporation, Armonk, N.Y.

[21] Appl. No.: 08/910,653

[22] Filed: Aug. 13, 1997

[51] Int. Cl.[7] .................................................. G06F 3/14
[52] U.S. Cl. .................... 345/339; 345/342; 345/347
[58] Field of Search .................................. 345/339, 340, 345/342, 347, 348, 349, 326, 346, 350, 334, 440, 975; 707/530, 531, 518, 519, 520, 521, 908, 911

[56] References Cited

U.S. PATENT DOCUMENTS

| | | | |
|---|---|---|---|
| 5,526,018 | 6/1996 | Fisher | 345/440 X |
| 5,581,670 | 12/1996 | Bier et al. | 345/326 |
| 5,588,108 | 12/1996 | Kumar et al. | 345/348 |
| 5,844,558 | 12/1998 | Kumar et al. | 345/339 |

OTHER PUBLICATIONS

Cowart, "Mastering Windows 3.1", Sybex, Inc., pp. 275–291, 325–326, 1993.

*Primary Examiner*—Crescelle N. dela Torre
*Attorney, Agent, or Firm*—Myers Bigel Sibley & Savjovec, P.A.; Jeanine S. Ray-Yarletts

[57] ABSTRACT

Visual interfaces or program products provide user interfaces for setting tabs in a data processing system including a visual measurement ruler with a ruler or measurement scale which is laterally extendable and retractable to match a desired spatial location on the display window responsive to a user's input. The number of columns associated with the ruler remains constant whether the ruler is extended or retracted. The ruler also includes a plurality of tabs disposed at certain positions along the length of the ruler. The tabs are individually moveable along the length of the ruler corresponding to a desired tab setting and the tabs can be individually removed or added according to a user's input. The ruler is moveable over the desktop display such that a user can overlay and visually align with a selected document to define tab settings thereon.

22 Claims, 6 Drawing Sheets

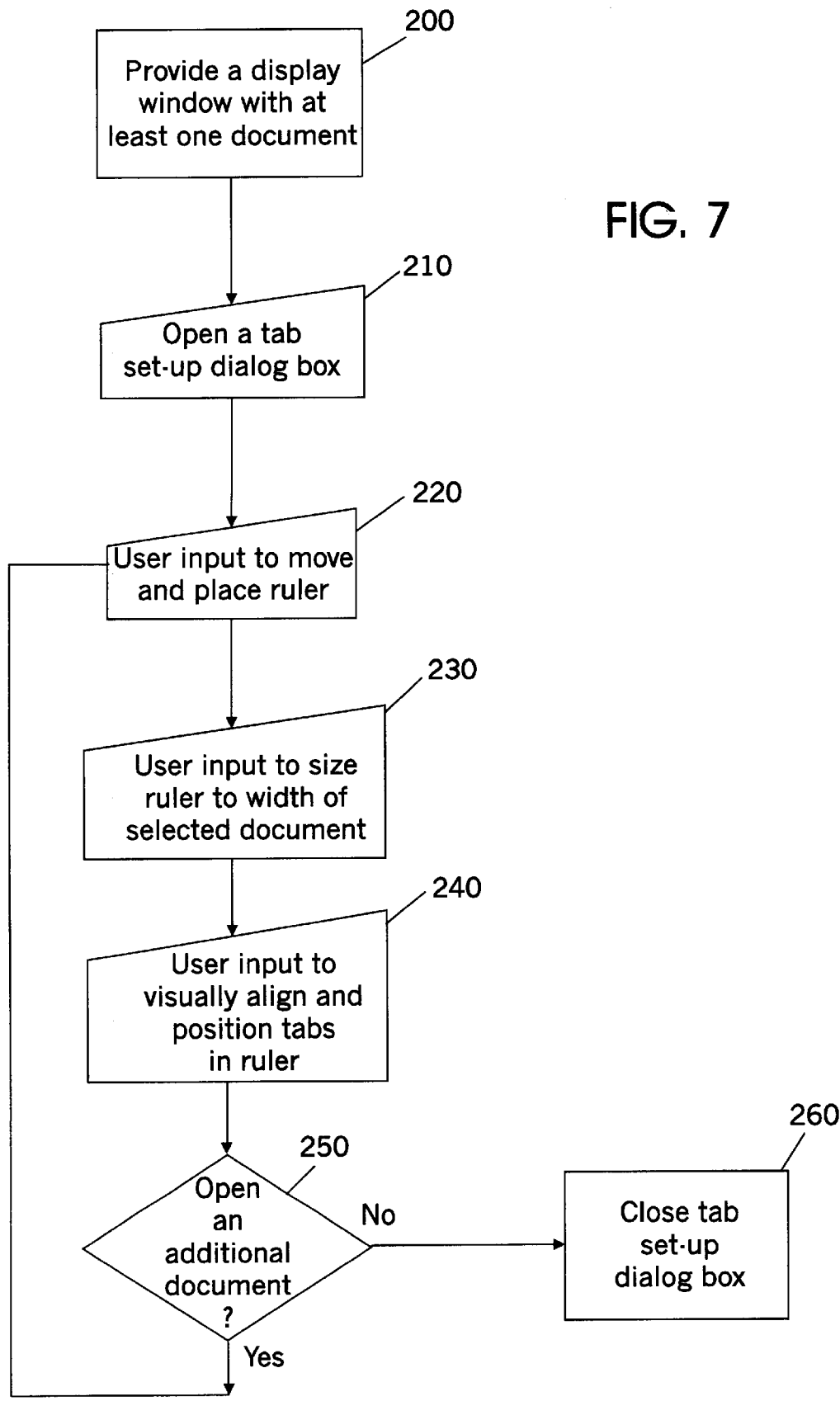

6,072,484

GRAPHIC USER INTERFACE FOR TAB SETTING WITH A RE-SIZEABLE SCALE

FIELD OF THE INVENTION

The present invention relates generally to user interfaces for computer systems. More particularly, the present invention relates to tab settings in a user interface environment for a computer system.

BACKGROUND OF THE INVENTION

Increases in processing capability and decreases in the cost of personal computers has led to the proliferation of personal computers in all aspects of society. Personal computers are utilized in schools, homes and in business. Furthermore, with the decreased costs of personal computers, it has become more feasible from a cost perspective to use computers for tasks, and to carry out functions, which were previously done without the use of computers.

With the proliferation of computers throughout numerous aspects of life has come a trend to graphic user interfaces which make using a computer more intuitive. Examples of such graphic user interfaces include IBM® OS/2®, Apple® System 7®, and Microsoft® Windows®. These operating systems all rely on a "window like"workspace for applications, operating system information, such as directory information, and program groupings.

One operation performed by users in many data processing applications is the setting of tab positions in a document. In the past, many such operations involved manually counting and inputting a column. With this type of user interface limitation, this task can be especially onerous when a user wants to copy a table or tab formatted contents from one application to another. For example, as illustrated by FIG. 1, a user typically counts columns in a source application document and then manually inputs the number in a field or informational box in a destination application. Accordingly, in view of the above, it is apparent that the increase in use of multiple data processing applications has brought about a need for improvements in the manipulation of tab settings in these user environments.

OBJECTS AND SUMMARY OF THE INVENTION

In view of the above limitations, of existing user interfaces for tab position settings in data processing applications, it is an object of the present invention to provide user interfaces which increase the ease of tabular settings in a user interface.

It is a further object of the present invention to provide user interfaces that increase the ease of determining and inputting tab settings between different applications.

These and other objects of the present invention are provided by methods, visual interfaces or program products which provide user interfaces for setting tabs in a data processing system. The user interface includes a desktop display window having access to a visual toolbar and a tab set-up dialog box operably associated with the toolbar. The dialog box comprises a visual measurement ruler with a first measurement scale and a fixed number of columns associated therewith. The ruler in the box is laterally extendable and retractable to match a desired spatial location on the display window responsive to a user's input. The number of columns associated with the ruler remains constant whether the ruler is extended or retracted. The dialog box also includes a plurality of tabs disposed at certain positions along the length of the ruler. The tabs are individually moveable along the length of the ruler corresponding to a desired tab setting and the tabs are individually removable according to a user's input. Advantageously, the box is moveable over the desktop display such that a user can overlay and visually align the dialog box to define tab settings with a selected window thereon.

Additionally and advantageously, a user can easily indicate by pulling or "dragging"the dialog box ruler to overlay the width of a first document displayed at a first location on the desktop display. The user can move the tab settings along the length of the overlaid ruler to correspond with tabulated data formats in the first document responsive to a user's direction (i.e., by pointing and clicking a peripheral device such as a mouse). Preferably, the dialog box and associated ruler are detachable from the first location and moveable to a second location on the display, for example, the dialog box can be moved between a first location such as a first application to a second location which can be a different application.

An additional embodiment of the present invention is a graphic user interface (GUI) for visually setting tabs in a computer displayed document. In particular, the GUI includes a tab set-up dialog box having lateral and longitudinal sides. The dialog box comprises a measurement ruler positioned on a lateral side of the box. The ruler has a predetermined number of columns associated therewith. The box also includes a plurality of tab position indicators positioned along the length of the measurement ruler and the tab position indicators are individually moveable responsive to a user's input. The box has a width which is adjustable to overlay a desired document width and the ruler width is adjustable corresponding to the box width. The predetermined number of columns remains constant independent of the physical size of the ruler. Preferably, the dialog box is accessible to a user via a displayed toolbar.

In a preferred embodiment, the tab dialog box is detachable and moveable from a first location on a display monitor to a second different location on the display monitor. Advantageously, the first location can be a first software application and the second location a second software application different from the first application.

The tab dialog box preferably includes a default number of columns according to standard applications (such as 80) and selectable other predetermined numbers of columns (such as 132). The box can also include an input for allowing the user to establish the desired number of columns. The dialog box can also automatically position tabs at default locations along the length of the ruler or allow the user to toggle the tabs (click) on and off and to visually point and click a mouse to adjust the position of selected tabs.

As will be appreciated by one of skill in the art, the above-described aspects and embodiments of the present invention may also be provided as method, data processing systems or computer program products.

The foregoing and other objects and aspects of the present invention are explained in detail in the specification set forth below.

BRIEF DESCRIPTION OF THE DRAWINGS

FIG. 7 is a flowchart of one embodiment of the present invention.

DESCRIPTION OF PREFERRED EMBODIMENTS

The present invention will now be described more fully hereinafter with reference to the accompanying figures, in which preferred embodiments of the invention are shown. This invention may, however, be embodied in many different forms and should not be construed as limited to the embodiments set forth herein. Like numbers refer to like elements throughout. The term "lateral"as used herein is intended to mean a direction defined by a vector drawn across the width of the computer screen. "Longitudinal"is meant to describe a direction perpendicular to the lateral direction, a direction which runs from the top to bottom of the computer screen.

As will be appreciated by one of skill in the art, the present invention may be embodied as a method, data processing system or program product. Accordingly, the present invention may take the form of an entirely hardware embodiment, an entirely software embodiment or an embodiment which combines software and hardware aspects. Furthermore, the present invention may take the form of a computer program product on a computer readable storage medium having computer readable program code means embodied in the medium. Any suitable computer readable medium may be utilized including for example, hard disks, CD-ROMs, optical storage devices, or magnetic storage devices.

Figure 1:
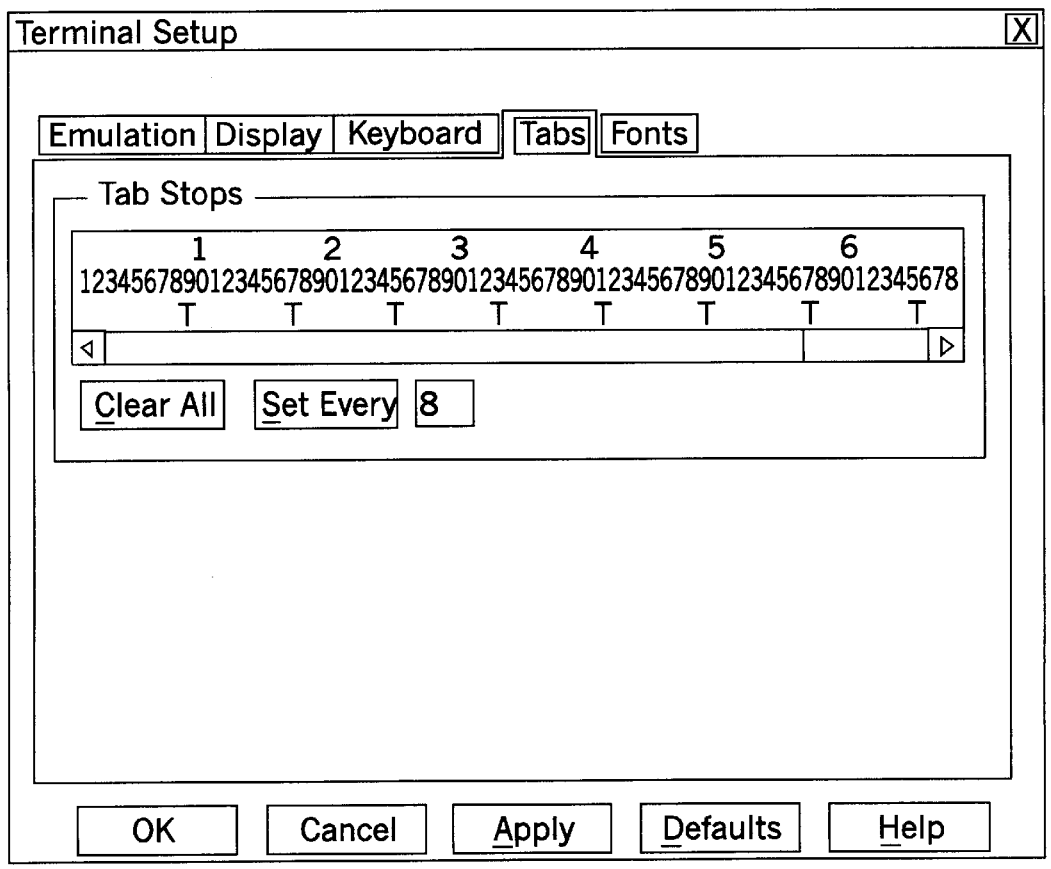
FIG. 1 illustrates a prior art tab setting user interface from a screen in Reflection 2 for WINDOWS NT Version 5.10, 32 bit edition (© 1990–1995 Walker Richer & Quinn, Inc.).
Figure 2:
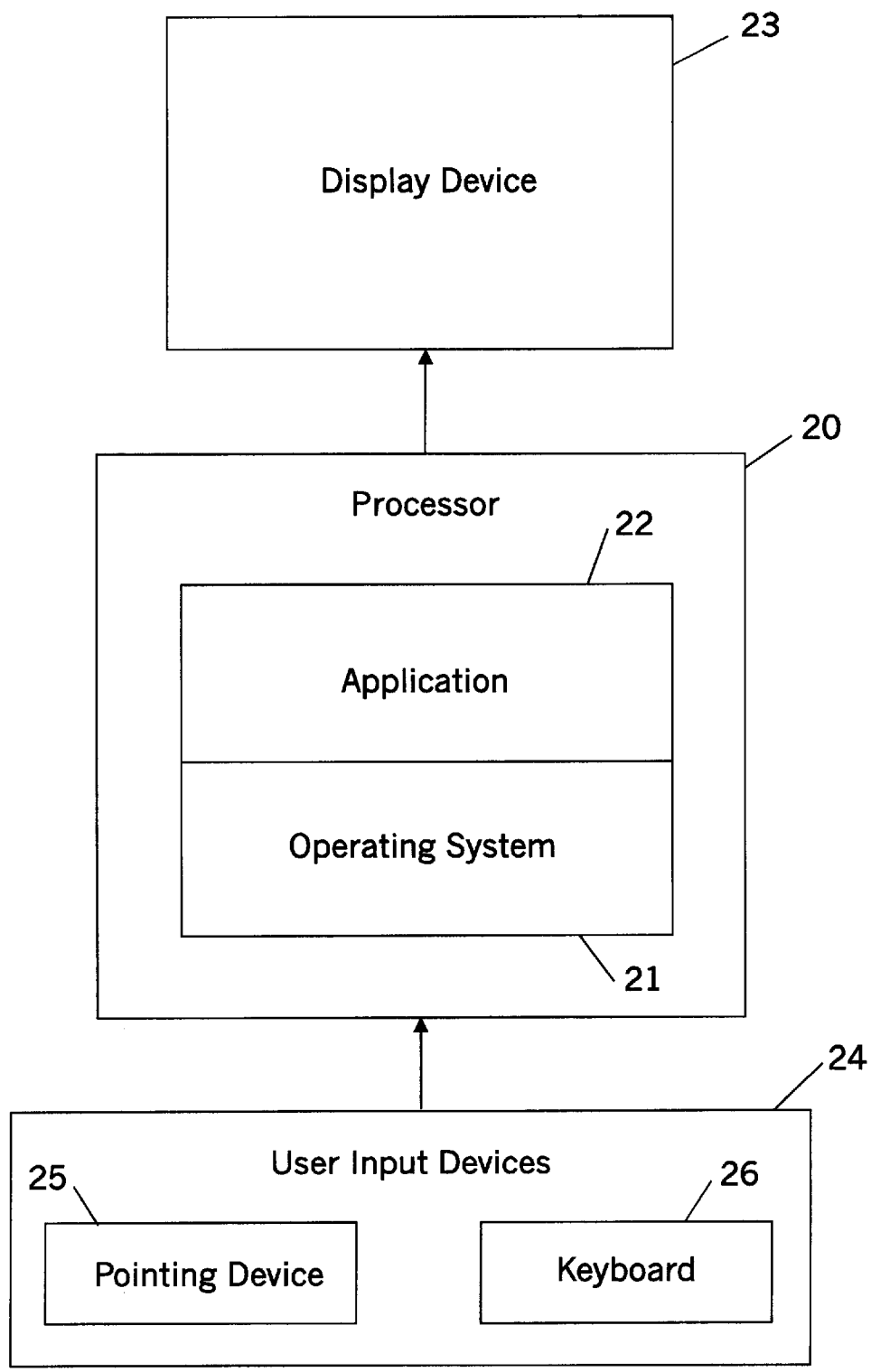
FIG. 2 is a logical diagram of a system utilizing the present invention.

FIG. 2 illustrates a data processing system on which user interfaces according to the present invention may be utilized. As seen in FIG. 2, a data processor 20 may have an operating system 21 resident in the processor. An application 22 may be running on the operating system. The processor 20 displays information on a display device 23. The display device 23 has a plurality of picture elements (collectively referred to as a screen) which may define the appearance of a user interface environment displayed on the display device 23. The contents of the screen device 23 and, therefore, the appearance of the user interface environment, may be controlled or altered by the application 22 or the operating system 21 either individually or in combination.

For obtaining input from a user, the operating system 21, the application 22 or both may utilize user-input devices 24. User input devices 24 may include a pointing device 25 and a keyboard 26 or other peripheral input devices known to those of skill in the art. User input devices 24 may be used to designate areas of the screen or locations on the screen such as the border of a workspace or the corner of the borders of the workspace. Furthermore, once designated, the user interface may display a separate icon to indicate that selection of that location of the screen may translate the feature of the workspace or the workspace itself to a different location. As is well known to those of skill in the art, multiple windows may be displayed on the screen of a computer display device simultaneously in what is often referred to as a "desktop"or display window. Windows within a desktop are defined by a border which surrounds the window and may also include a title bar and in some cases a series of menu choices which may manage the appearance and contents of the window. In combination with a pointing device, windows may typically be independently moved and resized by "dragging"a border to a new location. Resizing a window may also be accomplished by dragging the corner of a window which simultaneously resizes the window in two directions.

Figure 3:
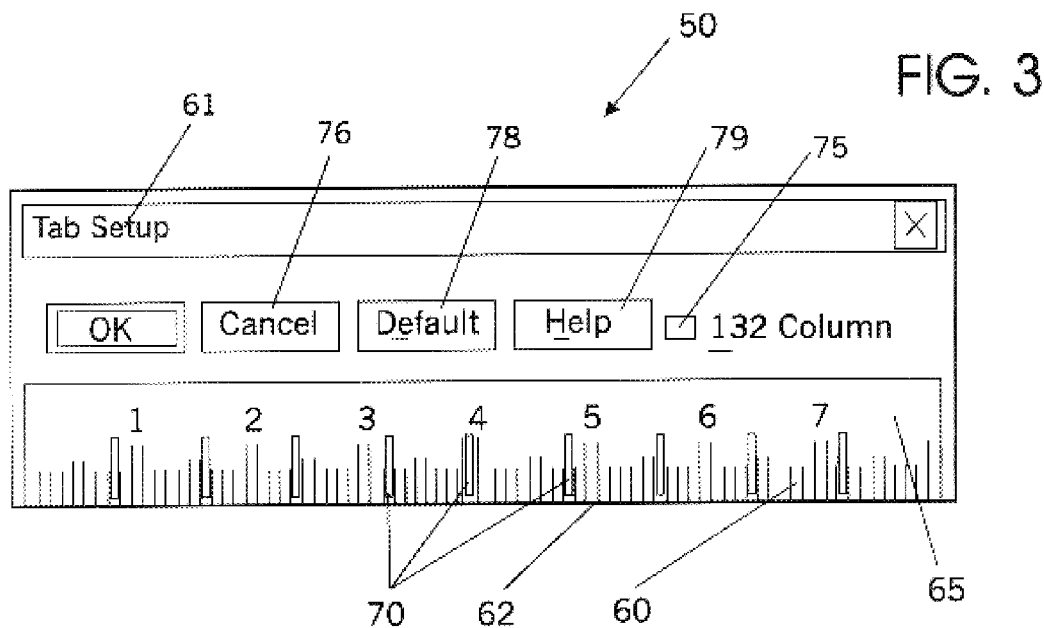
FIG. 3 is a diagram of a tab set-up box dialog screen according to a preferred embodiment of the present invention.
Figure 4:
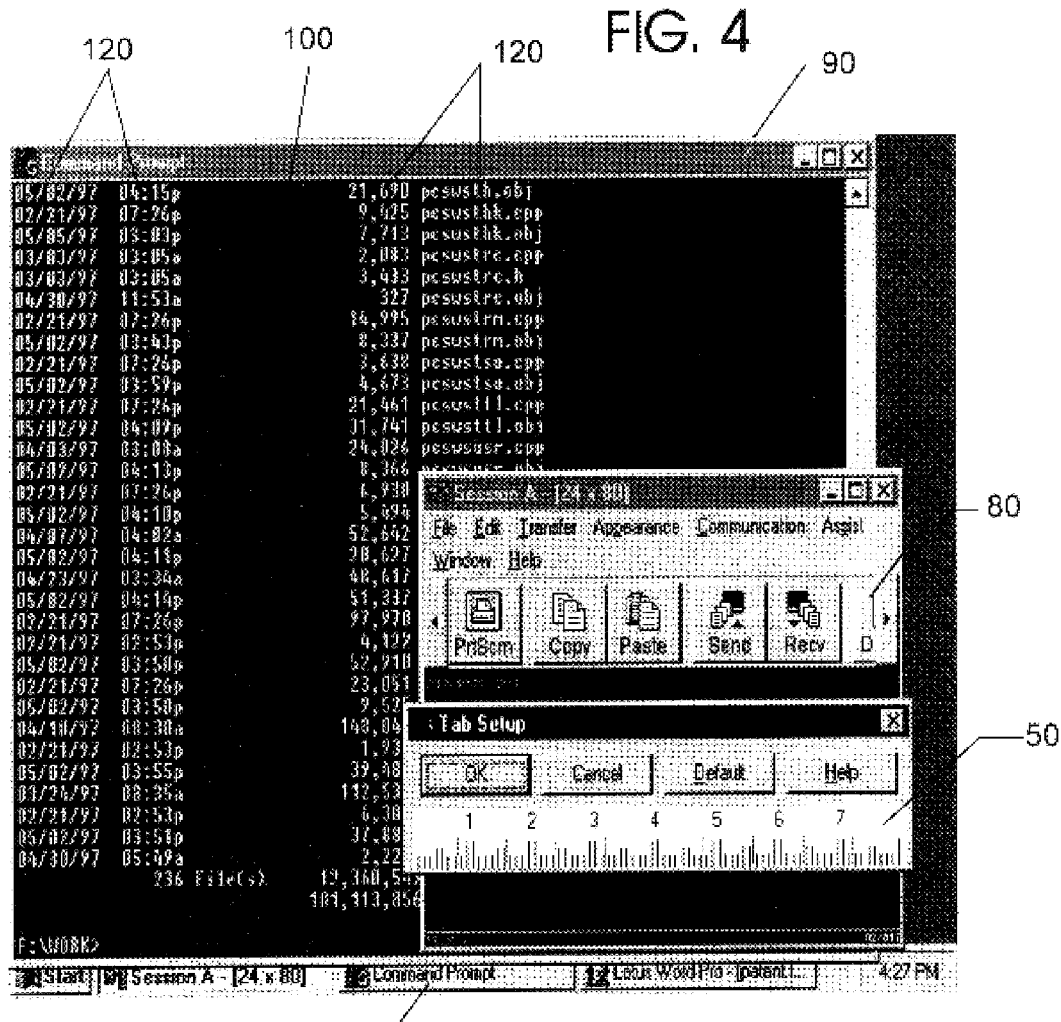
FIG. 4 is a diagram of the tab set-up screen of FIG. 3 opened into a window display with an open document according to a preferred embodiment of the present invention.

User input received from user input devices 24, may open or uncover a tab setup option window. Preferably, the tab-set up option window is accessible via an assist pull down button positioned in a toolbar on the display screen (FIG. 4). A preferred embodiment of the present invention is shown in FIG. 3. As shown, when selected, the tab set-up option includes a tab set-up dialog box 50. The tab dialog box 50 includes a laterally disposed ruler 60 and a scale 65. Preferably, the ruler 60 is positioned along a top or bottom edge 61, 62 of the box 50 so as to allow easier visual alignment with selected text contents as will be discussed further below. The ruler 60 includes a plurality of tab position indicators 70 positioned along the length thereof. These tab indicators 70 are preferably preset in default positions along the length of the ruler 60 (such as at every eight (8) columns) but can be individually toggled on or off by pointing, selecting, and clicking. Similarly, the tab position indicators 70 can individually be moved (selected and dragged or selected "clicked to delete"and "re-clicked to insert") to a different position along the length of the ruler to visually align with selected contents of a displayed document.

In a preferred embodiment, the box 50 is configured to have a fixed number of columns associated with the scale (distance between hash marks) of the ruler. This fixed number is selectable at the initiation of a tab set-up operation. For example, as shown, the default number of columns is set at eighty (80) with a selectable option selectable for one hundred thirty two (132) 75. Of course, this number can be user input to be any number as will be recognized by one of skill in the art. This fixed or constant column allows the ruler to be resized to differing document size while keeping the number of columns constant (and therefore the tab position) between documents even though the ruler is extended or retracted (made larger or smaller) corresponding to the targeted document. This is especially important in correlating documents to copy tabulated format contents running from different applications as will be discussed further below.

Also as shown in FIG. 3, the tab dialog box includes a plurality of selectable buttons 76, 77, 78, 79 which can assist the user in obtaining the desired tabular settings. The "ok" button 76 saves the tab indicators 70 at the positions shown on the screen at the time the button is depressed. The default button 78 aligns the tab position indicators 70 at predetermined positions along the ruler 60. The cancel and help buttons 77, 79 operate as conventional type buttons and are therefore self-explanatory.

Figure 5:
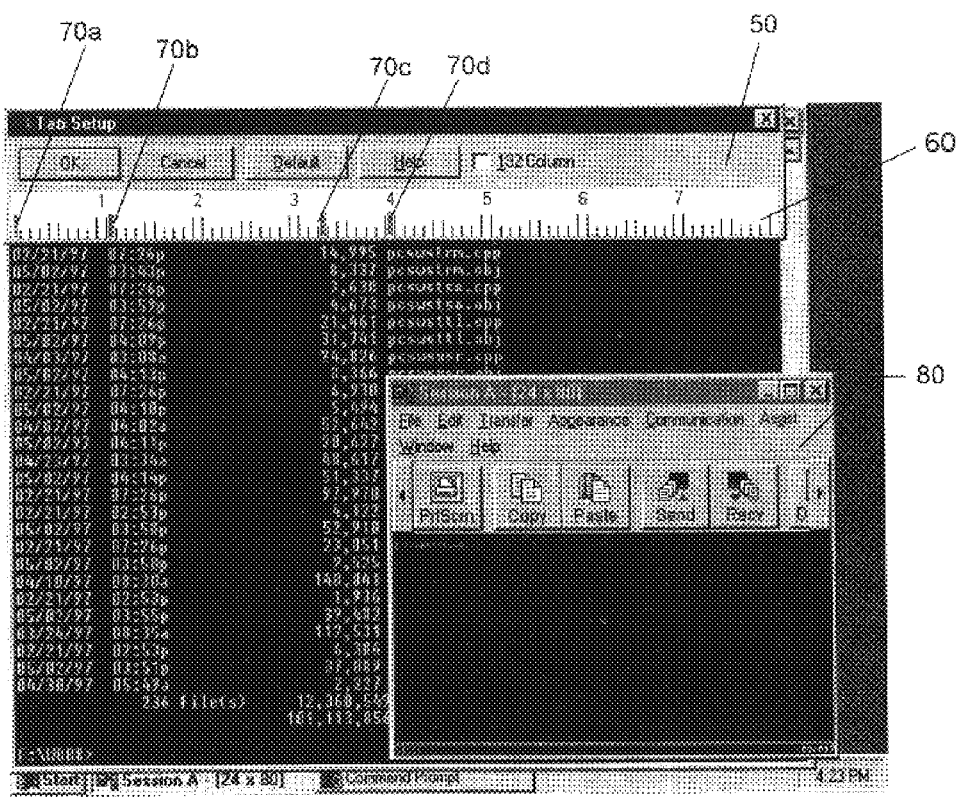
FIG. 5 is a diagram of the ruler moved and stretched to overlay the application document shown in FIG. 4.

Turning now to FIG. 4, a toolbar 80 on a display 90 has been selected and the tab setup option has been activated. The display 90 includes a first document 100 in a first application 110. As shown, when selected, the tab set-up box is compressed to a first size different from (and usually smaller than) the target document 100. Also as shown, the document 100 includes tabulated data 120. A user, using a user input device 24 can now select the dialog box 50 and move it to a different position on the display 90. FIG. 5 illustrates the dialog box 50 detached from the selected assist option menu or toolbar 80 and moved to overlay the top of the document 100. As shown, the ruler 60 has been clicked and dragged to overlay the width of the document. A user via user input devices 24 can now visually align and position tab indicators 70 over the starting fields of the tabulated data (70a, 70b, 70c, 70d). Once the tab indicators 70 are positioned properly, a user can select the "ok"button 76 to save the settings at the corresponding column locations. The number of tab indicators can be adjusted by individually "clicking"to add or remove selected tabs. For example, tabs of 1–9 or up to 80 or more can be easily employed according to the instant invention.

Figure 6:
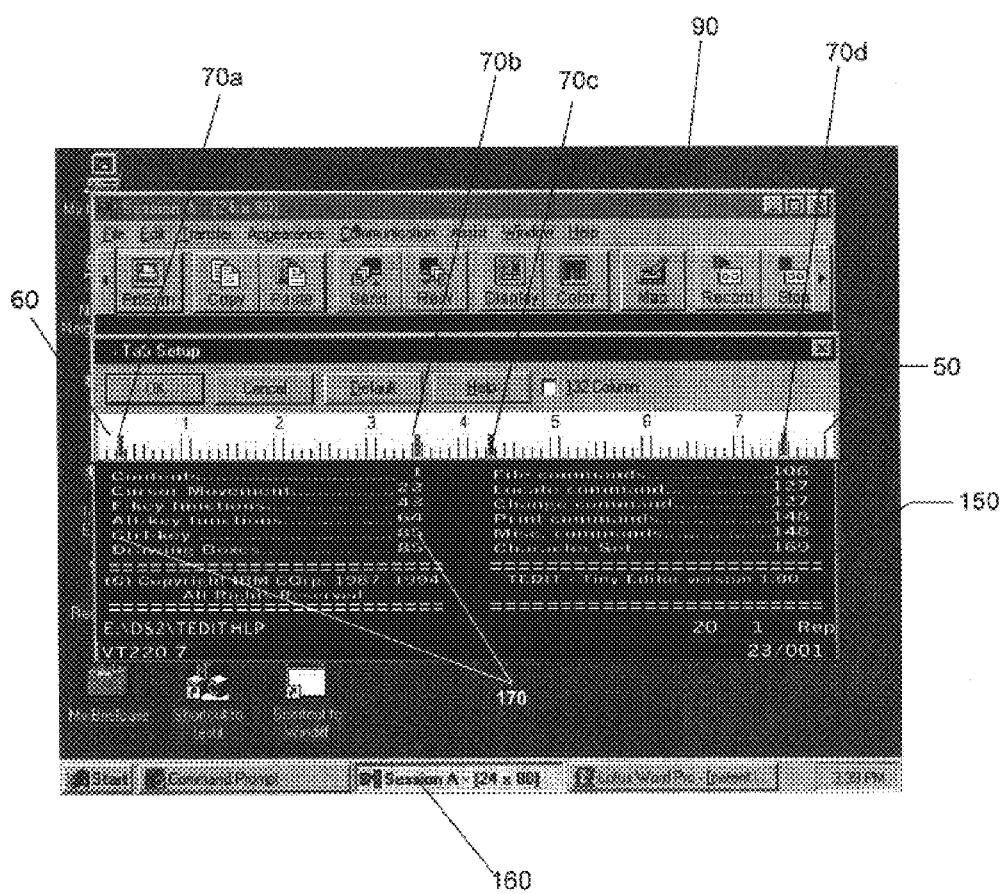
FIG. 6 is a diagram of a ruler moved and stretched to overlay a second document in a window display according to the present invention.

In one embodiment, as illustrated in FIG. 6, the ruler 60 can be detached from the first document 100 and moved to a second document 150. The ruler 60 (with the saved tab formats) is stretched or compressed through a user's input to a user input device 24 such that the ruler 60 overlays the width of the second document 150. As shown, the four tab indicators (70a, 70b, 70c, 70d) from the prior document 100 are moved along with the ruler 60. It will be appreciated that irrespective of the length of the ruler, with a fixed column size associated with the ruler scale, the number of hash marks between tab indicators is the same although the distance itself may be larger or smaller depending on the relative sizing and re-sizing of the dialog box 50.

The tab indicators 70a, 70b, 70c, 70d can be repositioned in the second document 150 such that they align with the tabulated data columns 170. Advantageously, with this visual alignment tab set-up tool, a user can more easily copy data from the second document 150 into the first document 100 with the columns appropriately tabbed without any manual count or input. The second document 150 can be in a second application 160 on the display 90.

FIG. 7 is a flow chart illustration of methods, apparatus (systems) and computer program products according to the invention. It will be understood that each block of the flowchart illustration, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce computer implemented process such that the instructions which execute on the computer or other programmable apparatus provide steps for implementing the functions specified in the flowchart block or blocks.

Accordingly, blocks of the flowchart illustrations support combinations of means for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

As seen in FIG. 7, a display window is provided with at least one document (or application) displayed thereon 200. A tab set-up option is then selected or opened by a user 210. User input is then received to move and position or place the ruler on a selected document as reflected in block 220. User input is also received to size the ruler to the width of the selected document 230. Once the ruler is positioned, user input is received to position tab indicators along the ruler corresponding to visual alignment with data fields in the document. If the user input specified opening an additional document (for example to copy certain contents into the first document), then as seen in block 250, user input is again received detaching the ruler and tab indicators from the first document and moving, placing and sizing same into the second document 220, 230. User input is again received to position tabs according to visual alignment of data fields in the second document 240. If the user input 250 specifies opening no additional documents, the dialog box is closed 260 (saving or canceling the tab settings as desired). As used herein, the terms "open"and "close"when used with regard to a document or window within a display refer to operations to make the contents of a document or application and the like either visible or hidden respectively. Furthermore, any method known to those of skill in the art of making a window or segment thereof visible, such as creating a pane, opening a pane, or expanding a pane from an iconized or minimized pane may be utilized in practicing the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A visual user interface for setting tabs for a data processing system, the user interface comprising:

a desktop display window having access to a visual toolbar;

a tab set-up set-up box operably associated with said toolbar, said dialog box comprising:

a visual measurement ruler with a first measurement scale and a fixed number of columns associated therewith, wherein said ruler in said box is laterally extendable and retractable to match a desired spatial location on said display window to align columnated data sets with tabular settings responsive to a user's input, and wherein the number of columns associated with said ruler remains constant whether said ruler is extended or retracted; and a plurality of tabs disposed at certain positions along the length of said ruler, wherein said tabs are individually moveable along the length of said ruler corresponding to a desired tab setting, and wherein said box is moveable over said desktop display such that a user can overlay and visually align said dialog box to define tab settings in a selected window thereon.

2. A visual user interface according to claim 1, wherein said display includes a first location having a first document displayed thereat such that a user can visually move said dialog box ruler to overlay the width of said first document, and wherein said tab settings are moveable along the length of said ruler to align and correspond with a first selected set of tabulated data having a first tabulated data format in said first document responsive to a user's direction, and wherein the ruler-established tab settings are used to visually define a relationship to a second set of tabulated data, different from the first set of tabulated data, the second set of tabulated data with a second tabulated data format such that said ruler and said tab settings are adjusted to relate said first selected tabulated data format therewith, and wherein said first and second sets of tabulated data can be merged together to have a single tabulated data format to thereby allow for easy importation of one data set with a tabular format into another data set with a different tabular format.

3. A visual user interface according to claim 2, wherein said box is detachable from said first location and moveable to a second location on said display.

4. A visual user interface according to claim 3, wherein said first location is a first application and said second location is a different application.

5. A visual user interface according to claim 4, wherein said second location has a different document size than said first location, and wherein said tab set-up dialog box is resizable such that the ruler retracts to overlay the dimensions of the second location with the same number of columns associated therewith.

6. A graphic user interface for visually setting tabs in a computer displayed document, comprising:

a tab set-up dialog box having lateral and longitudinal sides and an adjustable width, wherein said box is detachable and moveable from a first location on a display monitor to a second different location on the display monitor, said box comprising:

a measurement ruler positioned on a lateral side of said box, said ruler having a predetermined number of columns associated therewith, wherein said ruler is adjustable corresponding to the width of said box; and a plurality of tab position indicators positioned along the length of said measurement ruler, wherein said tab position indicators are graphically individually moveable responsive to a user's input to align with selected columnated data;

wherein said box has a width which is graphically adjustable to overlay a desired document width and said predetermined number of columns remains constant independent of the physical size of said ruler.

7. A graphic user interface according to claim 6, wherein said dialog box is accessible to a user via a displayed toolbar.

8. A graphic user interface according to claim 6, wherein said location is in a first software application and said second location is in a second software application different from said first application.

9. A visual user interface for positioning tab settings in a data processing system, the user interface comprising:

a computer display window having a first document thereon; and a compactly configured tab set-up dialog box operably associated with said display window comprising a visual measurement with an associated scale such that the scale corresponds to a fixed number of columns, said tab set-up dialog box including a plurality of tab position indicators associated therewith positioned along the length of said visual measurement and a plurality of user-selectable tab set-up buttons, wherein said tab set-up dialog box has a graphic user interface such that the box and measurement are resizable and moveable such that the visual measurement overlays and matches the width of the first document and said plurality of tab position indicators are visually alienable with selected columnated data in said first document after said dialog box is resized to match the width of the first document.

10. A visual user interface according to claim 9, wherein said fixed number of columns is selectable.

11. A visual user interface according to claim 10, wherein said fixed number of columns is one of 80 and 132.

12. A visual user interface according to claim 11, wherein said fixed number of columns has a default setting.

13. A visual user interface according to claim 12, wherein said default setting is 80.

14. A visual user interface according to claim 9, wherein said plurality of tab position indicators can be individually added or removed from said visual measurement.

15. A visual user interface according to claim 9, further comprising depressible button selections.

16. A visual user interface according to claim 9, wherein said dialog box is detachable from said first document and moveable and resizable to overlay a second document having a second set of columnated data with a second tab setting format, and wherein said dialog box defines a first tab setting format corresponding to selected columnated data in said first document, and wherein upon resizing said dialog box in said second document, said tab settings can be reset by a user to align said plurality of tab position indications to said columnated data in said second document, thereby allowing said second set of data to be imported into said first document to automatically align with said first tab setting format.

17. A visual user interface for positioning tab settings in a data processing system, the user interface comprising:

a computer display window having a first document thereon; and a tab set-up dialog box operably associated with said display window comprising a visual measurement with an associated scale such that the scale corresponds to a fixed number of columns, said tab set-up dialog box including a plurality of tab position indicators associated therewith positioned along the length of said visual measurement, wherein said tab set-up dialog box is resizable and moveable such that the visual measurement overlays and matches the width of the first document, wherein said dialog box is detachable from said first document and moveable and resizable to overlay a second document, and wherein said resized dialog box automatically positions tab position indicators corresponding to tab position indicator settings of the first document.

18. A method of providing a visual user interface for tab settings for a data processing system, comprising the steps of:

providing a computer display window having access to a first document;

opening a tab set-up dialog box in the computer display window, the box having a compressed display window size with a visually displayed resizable measurement scale and a plurality of tab position indicators positioned along the length thereof;

moving the tab set-up box from a first display window position to a second workspace position;

adjusting the width of the dialog box to overlay the width of the first document such that the measurement scale is positioned therealong; and accepting user input to indicate a visual position at which to position a tab indicator corresponding to a desired columnated data layout along the length of the measurement.

19. A method according to claim 18, wherein a user adjusts said box width by pointing, clicking, and pulling a peripheral device to a desired position on the display.

20. A method according to claim 18, further comprising the step of moving and removing selected ones of the plurality of tab position indicators by pointing, selecting, and depressing a peripheral device.

21. A method according to claim 18, further comprising the steps of:

detaching the dialog box from a first document with the tab indicators set to a position on the measurement scale corresponding to the first document columnated data layout;

moving the dialog box to a second document;

resizing the dialog box to overlay the width of the second document; and re-positioning the tab position indicators to correspond with desired columnated data in the second document, wherein the moving, re-sizing, and re-positioning steps are all performed via a user pointing, clicking, and pulling a graphic user input device to indicate the desired position of the tabular settings.

22. A computer program product for providing a user interface for a data processing system, the computer program product comprising:

a computer readable storage medium having computer readable program code means embodied in said medium, said computer-readable program code means comprising:

computer readable program code means for providing a window display having access to at least one text handling application and associated documents;

computer readable program code means for providing a re-sizable tab setting dialog box with a graphically displayed measurement ruler contained thereon;

computer readable program code means for displaying said tab box in said window display;

computer readable program code means for moving said displayed tab box to a selected document in one of said applications;

computer readable program code means for adjusting the size of said tab box such that the graphically displayed ruler overlays the width of the selected document;

computer readable program code means for accepting user input to indicate a desired position of a new tab setting by pointing and clicking a peripheral device at a desired position along the ruler;

computer readable program code means for detaching the displayed tab box from the selected document and moving the box to overlay a second document; and computer readable program code means for resizing the displayed tab box such that the ruler matches the width of the second document and the new tab settings from the first document are correspondingly resized with the ruler to maintain their relative position therealong.

* * * * *